United States Patent [19]

Udagawa

[11] Patent Number: 5,669,614

[45] Date of Patent: Sep. 23, 1997

[54] METAL GASKET HAVING BEAD WITH INCLINED END PORTION

[75] Inventor: Tsunekazu Udagawa, Ichikawa, Japan

[73] Assignee: Ishikawa Gasket Co., Ltd., Tokyo, Japan

[21] Appl. No.: 672,532

[22] Filed: Jul. 2, 1996

[51] Int. Cl.$^6$ ........................................ F16J 15/12
[52] U.S. Cl. ............................ 277/235 B; 277/207 R
[58] Field of Search ........................ 277/235 B, 180, 277/207 R, 236

[56] References Cited

U.S. PATENT DOCUMENTS

| | | | |
|---|---|---|---|
| 4,998,741 | 3/1991 | Udagawa | 277/235 B |
| 5,004,250 | 4/1991 | Udagawa | 277/235 B |
| 5,199,723 | 4/1993 | Udagawa | 277/235 B |
| 5,478,092 | 12/1995 | Ishikawa et al. | 277/235 B |

FOREIGN PATENT DOCUMENTS 0581615  2/1994  European Pat. Off. ........... 277/235 B

*Primary Examiner*—Daniel G. DePumpo
*Attorney, Agent, or Firm*—Kanesaka & Takeuchi

[57] ABSTRACT

A metal gasket of the invention is used for an internal combustion engine. The gasket is formed of at least one metal plate for constituting the metal gasket. The gasket includes at least one bolt hole, and a bead having a main portion extending toward the bolt hole and an end portion located near the bolt hole. The end portion extending from the main portion changes a direction to incline in a direction away from the bolt hole. Accordingly, the end portion can be easily compressed when a bolt passing through the bolt hole is tightened. The plate with the bead may be combined with other plates to form a metal laminate gasket.

8 Claims, 2 Drawing Sheets

METAL GASKET HAVING BEAD WITH INCLINED END PORTION

BACKGROUND OF THE INVENTION AND RELATED ART STATEMENT

The present invention relates to a metal gasket having a bead with an inclined end portion.

A metal gasket or metal laminate gasket has been used widely for an internal combustion engine. In the metal gasket, a bead is integrally formed with a metal plate to seal around a hole or portion, or to support a force applied to the gasket.

In case the bead is formed to completely surround a hole or portion, there is no end portion of the bead. However, in case the bead does not completely surround a portion, an end portion exists in the metal plate. Namely, this kind of bead includes a main portion and the end portions extending from the main portion.

Since the main portion of the bead is surround by two lateral edges, the bead can be relatively easily deformed when the gasket is compressed. However, since the end portion of the bead has an additional edge in addition to the two lateral edges, even if the force sufficient to deform the main portion of the bead is applied, the end portion of the bead may not be deformed. Generally, a force greater than the force required to deform the main portion is required for deforming the end portion.

In view of the above, U.S. Pat. No. 5,004,250 was proposed, wherein an end portion of the bead is widened to gradually decrease the force required for compression.

If there is a sufficient space for widening the end portion of the bead, the above patent operates as intended. However, if the space in the metal plate for the gasket is limited to form the wide end portion, the end portion can not be widened as required. Also, if a bead is formed in a limited space as long as possible, the wide end portion is not suitable.

Accordingly, one object of the invention is to provide a metal gasket having a bead with an inclined end portion to easily compress and deform the end portion of the bead.

Another object of the invention is to provide a metal gasket as stated above, wherein the end portion of the bead can be extended to a required portion as close as possible.

A further object of the invention is to provide a metal gasket as stated above, wherein a surface pressure can be substantially continuously provided even if the bead is interrupted near a bolt hole.

A still further object of the invention is to provide a metal gasket as stated above, wherein the gasket can be easily and economically formed.

Still further objects and advantages of the invention will be apparent from the following description of the invention.

SUMMARY OF THE INVENTION

A metal gasket of the invention is used for an internal combustion engine. The gasket is formed of a metal plate for constituting the gasket, and includes at least one bolt hole and a bead. The bead has a main portion extending toward the bolt hole and an end portion located near the bolt hole. The end portion extends from the main portion while slightly changing a direction to incline in a direction away from the bolt hole. Thus, the end portion can be easily compressed when a bolt passing through the bolt hole is tightened.

In the invention, when the bead extends toward the bolt hole, the end portion of the bead is inclined near the bolt hole in the direction away from the bolt hole. Since the end portion does not orient toward the bolt hole, the portion closest to the bolt hole can be compressed relatively easily. The end portion can be compressed relatively easily, as well. Namely, in this structure, the end portion can be compressed at a pressure less than that required for the bead where the end portion is directed to the bolt hole.

The end portion of the bead may be gradually tapered while the height of the bead is gradually reduced. On the other hand, the end portion of the bead may be gradually widened.

The gasket is preferably a cylinder head gasket, which includes at least two cylinder bores, an intermediate portion between the two cylinder bores, and a plurality of bolt holes. In case two bolt holes are located in the intermediate portion, the bead extends in the intermediate portion between the two bolt holes to partly surround one of the cylinder bores. Both end portions of the bead orient toward the one cylinder bore.

In this case, an additional bead may be situated near the one cylinder bore such that the additional bead and the bead extend around the one cylinder bore while being interrupted near the two bolt holes. The end portions of the additional bead near the bolt holes also orient toward the one cylinder bore.

Although the additional bead and the bead do not completely surround the cylinder bore, the end portions of the beads are properly compressed. Also, the bolt hole is located behind the portion between the end portions. Therefore, when the bolt is tightened, the sufficient surface pressure is formed around the cylinder bore without interruption. Accordingly, the cylinder bore can be sealed properly.

DETAILED DESCRIPTION OF PREFERRED EMBODIMENTS

Figure 1:
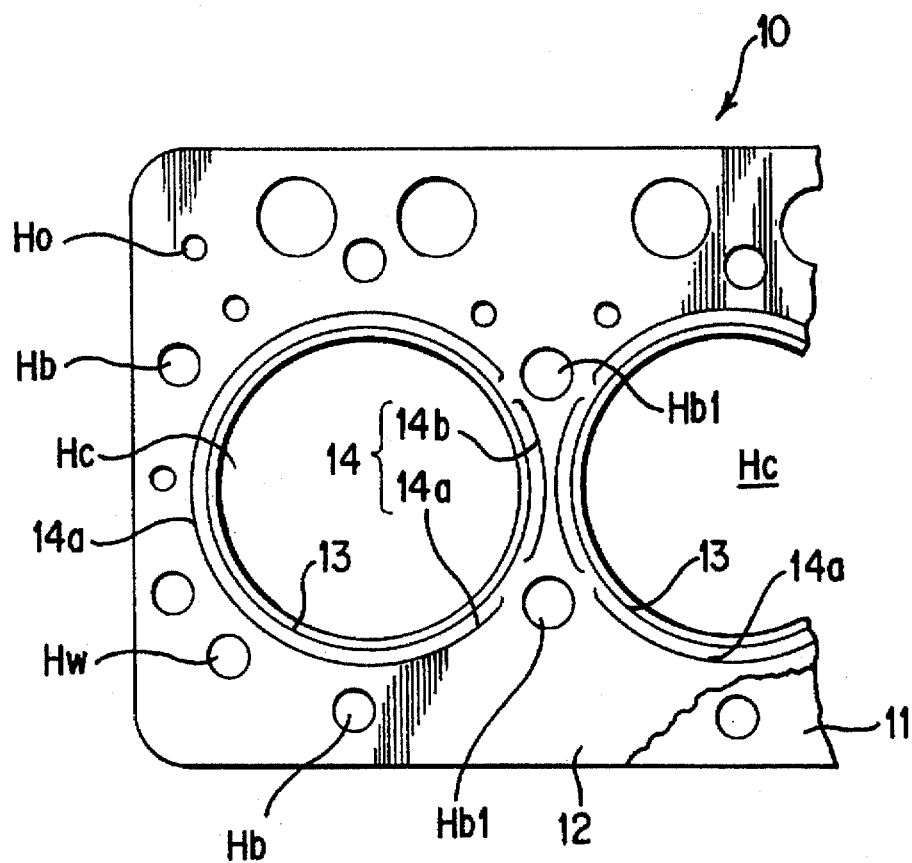
FIG. 1 is a plan view of a part of a cylinder head gasket of the present invention.

With reference to the drawings, the present invention applied to a cylinder head gasket is explained.

The cylinder head gasket 10 of the invention includes a plurality of cylinder bores Hc, water holes Hw, oil holes Ho, bolt holes Hb, Hb1 and so on, as in the conventional gasket. Since the invention is directed to the combination of the bead and the bolt hole, particularly around the cylinder bore, sealing means except for the cylinder bore are not explained. Any sealing means may be used for the water holes Hw and so on.

In the cylinder head gasket 10, the cylinder bores Hc are spaced apart from each other with a sufficient space therebetween, while six bolt holes Hb, Hb1 are arranged to surround the respective cylinder bores Hc. The bolt holes Hb1 situated between the cylinder bores Hc are disposed slightly closer to the cylinder bores Hc.

The gasket 10 is formed of an upper metal plate 11 and a lower metal plate 12, which extend substantially throughout the entire areas of engine parts to be sealed. The upper plate 11 is a plain metal plate and has a plurality of holes for the cylinder bore Hc, water holes Hw and so on.

The lower plate 12 is situated under the upper plate 11, and includes a plurality of holes for the cylinder bores Hc, water holes Hw and so on. The lower plate 12 includes inner beads 13 around the respective cylinder bores Hc, and outer beads 14 around the inner beads 13. Each outer bead 14 is formed of a main bead portion 14a and a short bead portion 14b, which are interrupted or discontinued near the bolt holes Hb1.

Namely, in the invention, in order to securely seal around the cylinder bore Hc, two beads 13, 14 are situated around the cylinder bore Hc. However, since the bolt holes Hb1 are located close to the cylinder bores Hc, the outer bead 14 can not be formed continuously. Therefore, end portions 14c of the bead portions 14a, 14b are oriented in the direction away from the bolt hole Hb1, i.e. toward the cylinder bore Hc in accordance with the invention.

In this respect, if the discontinued portion is made continuous and is curved in the direction of the inner bead 13 to escape or surround the bolt hole Hb1, the curved portion can not provide a surface pressure equal to other portions. Namely, an unbalanced surface pressure is formed around the cylinder bore Hc to possibly cause gas leakage from the cylinder bore Hc.

Generally, a main portion of a bead can be compressed easily, while an end portion of the bead is not compressed so easily, because the end portion is surrounded by three edges and the main portion is surrounded by two edges. In case the end portion is located near and directed toward the bolt hole, it requires relatively large force to compress the end portion of the bead when comparing with the compressing force required at the main portion of the bead. On the other hand, in case the end portion of the bead is located near and directed away from the bolt hole, i.e. compression force is applied from the side of the main portion, the end portion can be compressed relatively easily.

In the invention, since the end portions 14c are oriented away from the bolt hole Hb1, when the bolt in the bolt hole Hb1 is tightened, the end portion 14c is compressed from the middle side of the bead. Therefore, the end portion 14c of the bead can be compressed relatively easily.

The end portions 14c of the beads 14a, 14b are slightly spaced apart from each other for a distance less than a diameter of the bolt hole Hb1. However, when the bolt is tightened, the space 15 is strongly compressed by the bolt to provide a surface pressure thereat. Therefore, although the space 15 is formed between the beads 14a, 14b, the space 15 does not cause large decrease of the surface pressure.

If the end portions 14c do not orient toward the cylinder bore Hc, a large force is required to compress the end portions 14c of the bead. Also, a large surface pressure can not be formed at the space 15 when the bolt is tightened.

Figure 2:
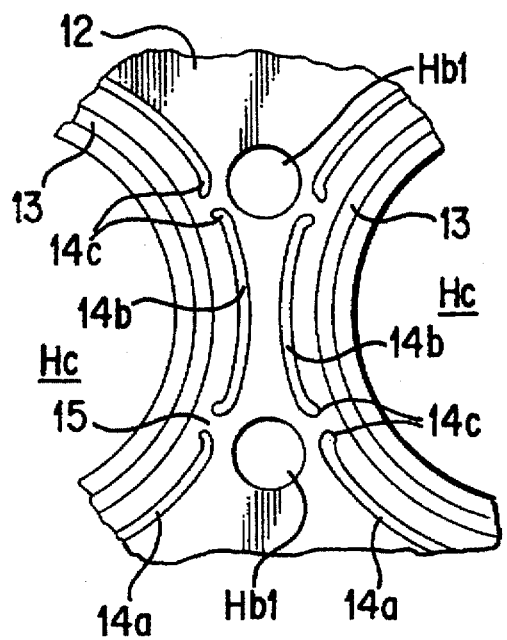
FIG. 2 is an enlarged plan view of an intermediate portion of the gasket of the invention.
Figure 3:
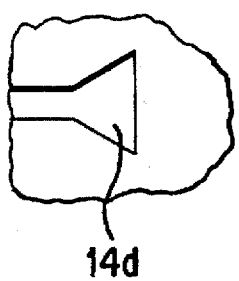
FIG. 3 is an enlarged view of an end of a bead used in another embodiment of the invention.

In the embodiment as shown in FIG. 2, the end portion 14c of the bead is gradually decreased in height and width. Namely, after the direction of the bead is changed, the height and width of the bead are gradually reduced. However, as shown in FIG. 3 and disclosed in U.S. Pat. No. 5,004,250, an end portion 14d may be gradually widened while the height of the end portion 14d is decreased, so that the surface pressure applied to the bead is gradually decreased or dispersed.

Figure 4:
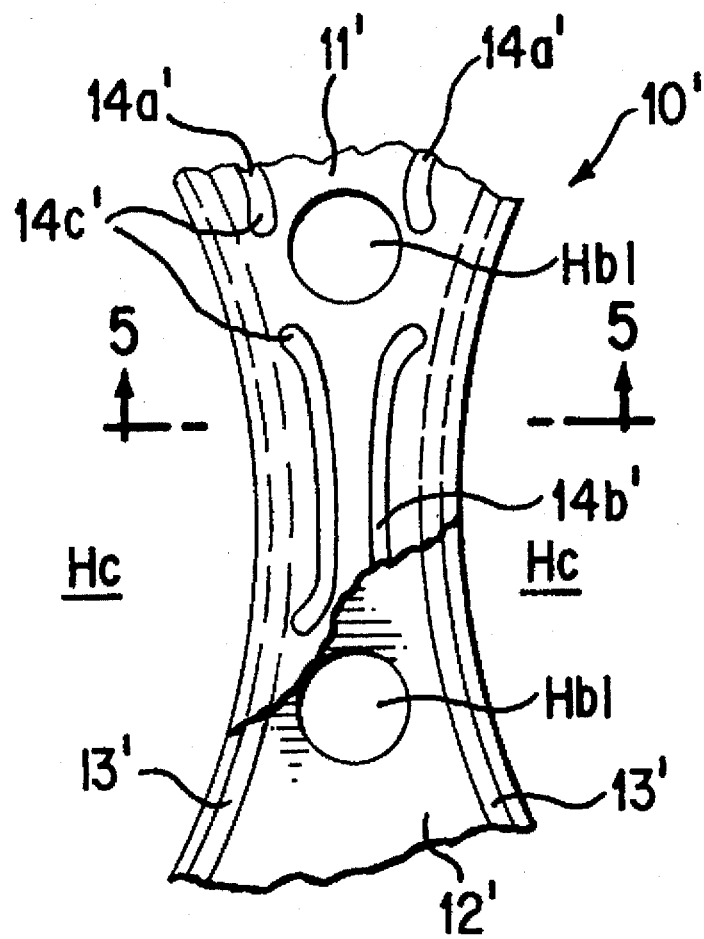
FIG. 4 is a plan view of an intermediate portion, similar to FIG. 2, of a different embodiment of the gasket of the invention.
Figure 5:
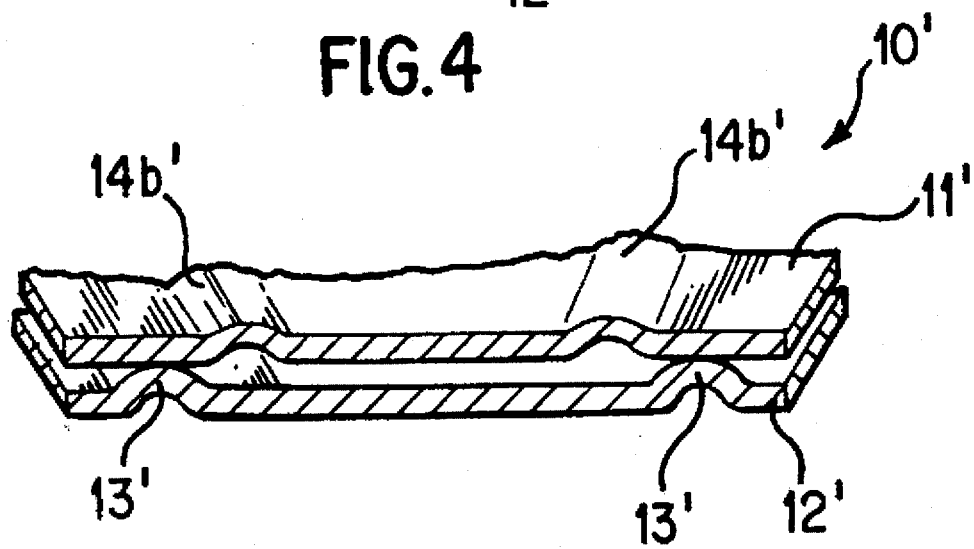
FIG. 5 is an enlarged perspective sectional view taken along line 5—5 in FIG. 4.

FIGS. 4 and 5 show a different embodiment 10' of a gasket of the invention. The gasket 10' is formed of an upper metal plate 11' and a lower metal plate 12', as in the gasket 10. However, the lower plate 12' includes annular beads 13' around the cylinder bores Hc, while the upper plate 11' includes main bead portions 14a' and short bead portions 14b', which are interrupted or discontinued near the bolt holes Hb1. End portions 14c' of the bead portions 14a', 14b' are oriented in the direction away from the bolt hole Hb1, i.e. toward the cylinder bores Hc.

Namely, in the gasket 10, the beads 13, 14a, 14b are formed in the lower plate 12, but in the gasket 10', the beads 13' are formed in the lower plate 12' and the beads 14a', 14b' are formed in the upper plate 11'.

In the gasket 10', the beads 13' are formed to provide surface pressure stronger than the beads 14a', 14b' by using the plate 12' thicker than the plate 11' and forming the width of the bead 13' shorter than each width of the beads 14a', 14b'. In the gasket 10', since the beads 13' and the beads 14a', 14b' are formed on the separate plates 11', 12', the surface pressures on the beads 13', 14a', 14b' can be easily adjusted by changing the thickness of the metal plate. Also, the adjustment of the surface pressures can be easily made by selecting the plates or the beads. Further, the surface pressures near the bolt holes Hb1 can be adjusted by the beads 14a', 14b'.

In the invention, the bead extending toward or close to the bolt hole changes the direction at the end portion. Accordingly, the end portion of the bead can be compressed by the bolt without applying a large force. The plate with the bead of the invention may be used as a single metal plate gasket, or may be combined with other plates to form a metal laminate gasket.

While the invention has been explained with reference to the specific embodiments of the invention, the explanation is illustrative, and the invention is limited only by the appended claims.

What is claimed is:

1. A metal gasket for an internal combustion engine comprising, a metal plate for constituting the metal gasket including at least one bolt hole; a bore situated near the at least one bolt hole; a first bead extending around the bore while the first bead is interrupted near the bolt hole, said first bead having a main portion extending toward the bolt hole and at least two end portions located near the bolt hole, each of said end portions which extend from the main portion changing a direction to incline toward the bore so that the end portion can be easily compressed when a bolt passing through the bolt hole is tightened; and a second bead completely surrounding said bore inside said first bead.

2. A metal gasket according to claim 1, wherein each of said end portions of the first bead is gradually tapered while the height of the first bead is gradually reduced.

3. A metal gasket according to claim 1, wherein each of said end portions of the first bead is gradually widened while the height of the first bead is gradually reduced.

4. A metal gasket according to claim 1, wherein said gasket is a cylinder head gasket having at least two cylinder bores, each of which correspond to said bore, an intermediate portion between the two cylinder bores, and a plurality of bolt holes, two of said bolt holes being located in the intermediate portion, said first bead extending around one of the cylinder bores, both end portions of the first bead orienting toward said one cylinder bore.

5. A metal gasket according to claim 4, further comprising an additional metal plate disposed under the metal plate to constitute a metal laminate gasket and including at least two cylinder bores, an intermediate portion and a plurality of bolt holes corresponding to those of the metal plate.

6. A metal gasket according to claim 1, wherein two bolt holes are situated near the bore, said first bead having a main bead and a short bead, each of the two bolt holes being located near an end of the main bead and an end of the short bead, said end portions of the main and short beads orienting toward the bore.

7. A metal gasket for an internal combustion engine comprising, a metal plate for constituting the metal gasket including at least one bolt hole; a bore situated near the at least one bolt hole; and a first bead extending around the bore while the first bead is interrupted near the bolt hole, said first bead having a main portion extending toward the bolt hole and at least two end portions located near the bolt hole, each of said end portions which extend from the main portion changing a direction to incline toward the bore so that the end portion can be easily compressed when a bolt passing through the bolt hole is tightened; and an additional metal plate disposed under the metal plate to constitute a metal laminate gasket and including at least one bolt hole and a bore corresponding to those of the metal plate, said additional metal plate having a second bead completely surrounding the bores thereof, said second bead being located inside said first bead formed on the metal plate.

8. A metal gasket according to claim 7, wherein said gasket is a cylinder head gasket having at least two cylinder bores, each of which correspond to said bores, an intermediate portion between the two cylinder bores, and a plurality of bolt holes, two of said bolt holes being located in the intermediate portion, said first bead extending around one of the cylinder bores, both end portions of the first bead orienting toward said one cylinder bore.

* * * * *